US012148959B2

United States Patent
Goto et al.

(10) Patent No.: US 12,148,959 B2
(45) Date of Patent: Nov. 19, 2024

(54) METAL SEPARATOR, FUEL CELL, AND METHOD OF PRODUCING METAL SEPARATOR

(71) Applicant: HONDA MOTOR CO., LTD., Tokyo (JP)

(72) Inventors: Shuhei Goto, Wako (JP); Akihito Giga, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 932 days.

(21) Appl. No.: 17/190,978

(22) Filed: Mar. 3, 2021

(65) Prior Publication Data

US 2021/0280877 A1    Sep. 9, 2021

(30) Foreign Application Priority Data

Mar. 4, 2020 (JP) ................................ 2020-036391

(51) Int. Cl.
| | | |
|---|---|---|
| *H01M 8/0258* | (2016.01) | |
| *H01M 8/0206* | (2016.01) | |
| *H01M 8/0221* | (2016.01) | |
| *H01M 8/0228* | (2016.01) | |
| *H01M 8/0247* | (2016.01) | |

(Continued)

(52) U.S. Cl.
CPC ....... *H01M 8/0258* (2013.01); *H01M 8/0206* (2013.01); *H01M 8/0221* (2013.01); *H01M 8/0228* (2013.01); *H01M 8/0247* (2013.01); *H01M 8/0267* (2013.01); *H01M 8/1004* (2013.01)

(58) Field of Classification Search
CPC ............. H01M 8/0247; H01M 8/0258; H01M 8/0206; H01M 8/0221; H01M 8/0228
See application file for complete search history.

(56) References Cited

U.S. PATENT DOCUMENTS

| 2009/0042086 A1 | 2/2009 | Ishikawa et al. | |
| 2013/0327470 A1* | 12/2013 | Gottmann | ........... H01M 8/0228 156/196 |

(Continued)

FOREIGN PATENT DOCUMENTS

| CN | 101364648 A | 2/2009 |
| CN | 101964425 A | 2/2011 |

(Continued)

OTHER PUBLICATIONS

JP2017079142 English Translation. Yamano et al. Japan. Apr. 27, 2017 (Year: 2017).*

(Continued)

*Primary Examiner* — Christopher P Domone
(74) *Attorney, Agent, or Firm* — Carrier, Shende & Associated P.C.; Joseph P. Carrier; Fulchand P. Shende

(57) ABSTRACT

A metal separator is stacked on each of both surfaces of a membrane electrode assembly to form a fuel cell. A method of producing the metal separator includes a metal plate processing step of producing a metal plate including a fluid passage and a fluid flow field, and a rubber adding step of adhering a plurality of rubber extension parts extending from the fluid passage toward the fluid flow field, to the metal plate. In the rubber adding step, a primer is coated on the metal plate in an island pattern, and the metal plate and the rubber extension parts are adhered together through the primer in a dot pattern.

9 Claims, 8 Drawing Sheets

(51) Int. Cl.
*H01M 8/0267* (2016.01)
*H01M 8/1004* (2016.01)

(56) References Cited

U.S. PATENT DOCUMENTS

| | | | |
|---|---|---|---|
| 2014/0037915 A1* | 2/2014 | Rebouillat | H01M 8/0245 428/201 |
| 2019/0109336 A1 | 4/2019 | Shibata | |
| 2021/0280891 A1* | 9/2021 | Nishiyama | H01M 8/247 |

FOREIGN PATENT DOCUMENTS

| | | |
|---|---|---|
| JP | 2005-005012 A | 1/2005 |
| JP | 2007-134204 A | 5/2007 |
| JP | 2009-104987 A | 5/2009 |
| JP | 2010-027332 A | 2/2010 |
| JP | 2011-165589 A | 8/2011 |
| JP | 2017-050206 A | 3/2017 |
| JP | 2017-079142 A | 4/2017 |
| JP | 2017-183198 A | 10/2017 |
| JP | 2019-071263 A | 5/2019 |

OTHER PUBLICATIONS

JP2007134204 English Translation. Terada et al. Japan. May 31, 2007 (Year: 2007).*
JP2005005012 English Translation. Yoshitoshi. Japan. Jan. 6, 2005. (Year: 2005).*
Office Action dated Jul. 4, 2023 issued in the corresponding Japanese Patent Application 2020-036391 with the English translation thereof.
Office Action dated Nov. 29, 2023 issued in the corresponding Chinese Patent Application No. 202110236029.X with the English machine translation thereof.
Edited by Wang Zhihong, Handbook of Modern Waterproofing Technology, p. 104, China Building Materials Press, Date of publication Mar. 31, 2016 with the English machine translation thereof.
Edited by Wang Limei et al., Building Engineering Construction Technology, p. 213, Southwest Jiaotong University Press, Date of publication Sep. 30, 2015, with the English machine translation thereof.

* cited by examiner

METAL SEPARATOR, FUEL CELL, AND METHOD OF PRODUCING METAL SEPARATOR

CROSS-REFERENCE TO RELATED APPLICATION

This application is based upon and claims the benefit of priority from Japanese Patent Application No. 2020-036391 filed on Mar. 4, 2020, the contents of which are incorporated herein by reference.

BACKGROUND OF THE INVENTION

Field of the Invention

The present invention relates to a metal separator stacked on each of both surfaces of a membrane electrode assembly to form a fuel cell. Further, the present invention relates to the fuel cell including this metal separator, and a method of producing the metal separator.

Description of the Related Art

A fuel cell includes a membrane electrode assembly (MEA) formed by stacking an anode, a solid polymer electrolyte membrane, and a cathode. The MEA is sandwiched between a pair of metal separators (bipolar plates) to form the fuel cell. In the fuel cell stack formed by stacking a plurality of fuel cells, a coolant flow field as a passage of a coolant is formed between metal separators of fuel cells that are adjacent to each other. The metal separator includes coolant passages extending in a stacking direction of the fuel cell, for allowing a coolant to flow through the coolant flow field.

As disclosed in Japanese Laid-Open Patent Publication No. 2007-134204, in some of metal separators of this type, in order to provide both of a leakage prevention function of preventing leakage of reactant gases and a coolant used in power generation and an insulating function, a rubber member (seal member) is provided on a metal plate (base member). The rubber member is formed integrally with the metal plate through a primer coated on a surface of the metal plate. This rubber member is also provided between coolant passages and a coolant flow field to form a bridge section as a passage of the coolant.

SUMMARY OF THE INVENTION

In this regard, in the metal separator of this type, a primer is coated uniformly on a metal plate to form rubber. However, the primer coated on the metal plate may be lost locally due to die closing, etc. for forming rubber at the time of production. In this case, there is a concern that leaked current through the coolant and/or the produced water may be concentrated at the position where the primer is lost during power generation of the fuel cell, and pitting corrosion, etc. may occur due to corrosion resulting from the electric potential difference.

Further, during power generation, water which has been vaporized, etc. (coolant) may enter the portion between the metal plate and the rubber member, and the water vapor may be condensed to form blisters (water swelling) between the metal plate and the rubber member. When the rubber member is swollen toward the fluid channel due to formation of the blisters, the channel cross sectional area is reduced, and the flow of the fluid (the reactant gases and the coolant) is obstructed.

The present invention has been made to solve the above problem, and an object of the present invention is to provide a metal separator, a fuel cell, and a method of producing the metal separator in which, with simple structure, it is possible to suitably discharge water from a portion between a metal plate and a rubber member, and suppress formation of blisters, or prevent pitting corrosion.

In order to achieve the above object, according to a first aspect of the present invention, provided is a metal separator stacked on each of both surfaces of a membrane electrode assembly to form a fuel cell, the membrane electrode assembly including an electrolyte membrane and electrodes provided on both surfaces of the electrolyte membrane. The metal separator includes: a metal plate including a fluid passage configured to allow fluid to flow in a stacking direction, the metal plate forming a fluid flow field configured to allow the fluid to flow along a separator surface; and a plurality of rubber extension parts adhered to the metal plate, and extending from the fluid passage toward the fluid flow field. Between the plurality of rubber extension parts, a metal surface of the metal plate is exposed, and a channel configured to connect the fluid passage and the fluid flow field is formed. The plurality of rubber extension parts are adhered to the metal plate through a plurality of dot primers between the metal plate and the rubber extension parts.

Further, in order to achieve the above object, according to a second aspect of the present invention, provided is a fuel cell comprising a metal separator stacked on each of both surfaces of a membrane electrode assembly, the membrane electrode assembly including an electrolyte membrane and electrodes provided on both surfaces of the electrolyte membrane. The metal separator includes: a metal plate including a fluid passage configured to allow fluid to flow in a stacking direction, the metal plate forming a fluid flow field configured to allow the fluid to flow along a separator surface; and a plurality of rubber extension parts adhered to the metal plate, and extending from the fluid passage toward the fluid flow field. Between the plurality of rubber extension parts, a metal surface of the metal plate is exposed, and a channel configured to connect the fluid passage and the fluid flow field is formed. The plurality of rubber extension parts are adhered to the metal plate through a plurality of dot primers between the metal plate and the rubber extension parts.

Further, in order to achieve the above object, according to a third aspect of the present invention, provided is a method of producing a metal separator stacked on each of both surfaces of a membrane electrode assembly to form a fuel cell, the membrane electrode assembly including an electrolyte membrane and electrodes provided on both surfaces of the electrolyte membrane. The method includes: a metal plate processing step of producing a metal plate including a fluid passage configured to allow fluid to flow in a stacking direction, the metal plate forming a fluid flow field configured to allow the fluid to flow along a separator surface; and a rubber adding step of providing, on the metal plate, a plurality of rubber extension parts extending from the fluid passage toward the fluid flow field. Between the plurality of rubber extension parts, a metal surface of the metal plate is exposed, and a channel configured to connect the fluid passage and the fluid flow field is formed. In the rubber adding step, the plurality of rubber extension parts are adhered to the metal plate through a plurality of dot primers.

In the metal separator, the fuel cell, and the method of producing the metal separator, with the simple structure, it is possible to suitably discharge water from the portion between the metal plate and the rubber member. Further, by eliminating local concentration of leakage current, it is possible to prevent pitting corrosion due to corrosion resulting from the electric potential difference.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Hereinafter, a preferred embodiment of the present invention will be described in detail with reference to the accompanying drawings.

Figure 1:
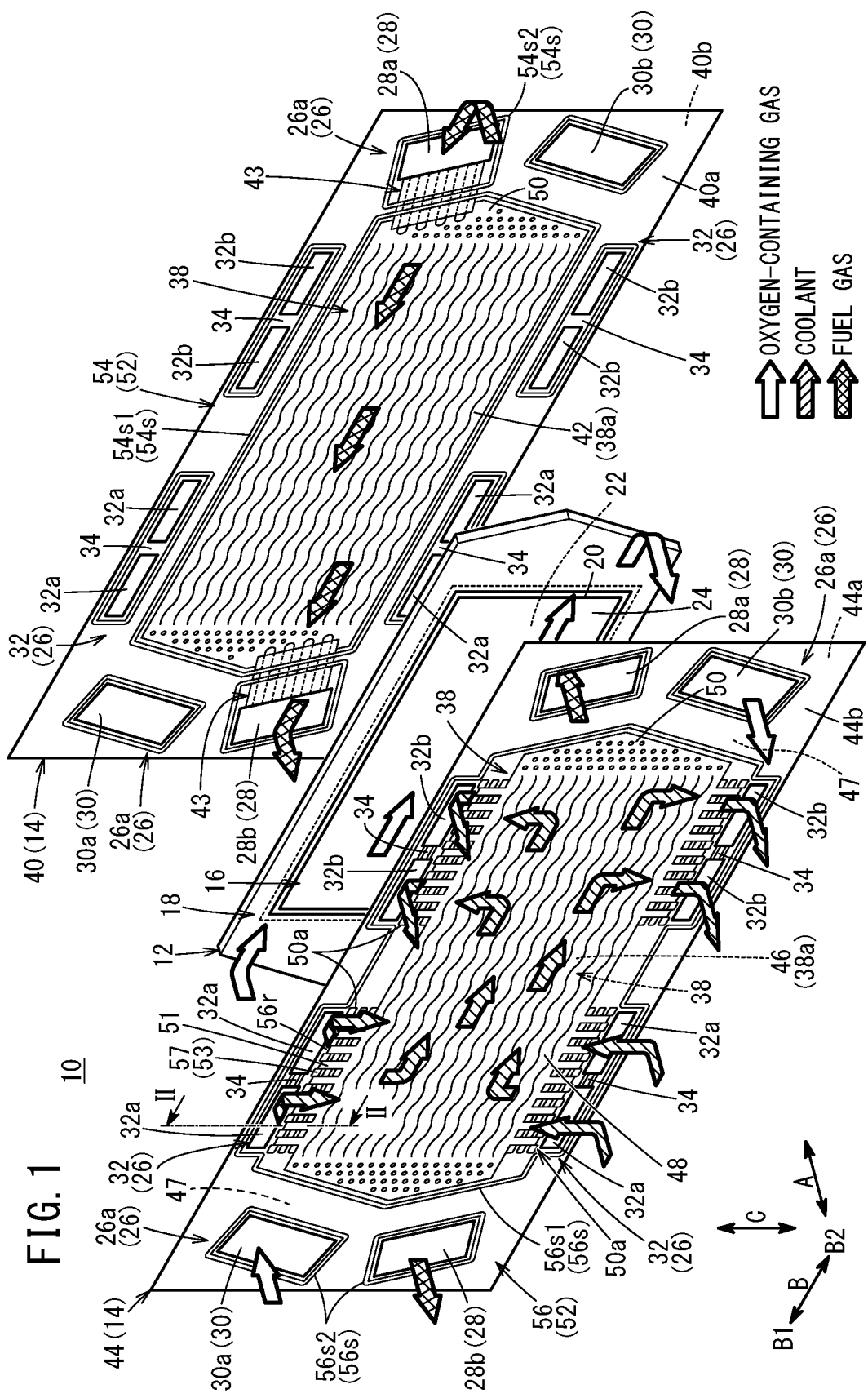
FIG. 1 is an exploded perspective view showing a fuel cell according to an embodiment of the present invention.

As shown in FIG. 1, a fuel cell 10 according to an embodiment of the present invention forms a unit of a power generation cell which performs power generation based on reactions of a fuel gas (anode gas) and an oxygen-containing gas (cathode gas) as reactant gases. A plurality of the fuel cells 10 are stacked together in the direction indicted by the arrow A to form a fuel cell stack (not shown). For example, the fuel cell stack is mounted in a fuel cell automobile (not shown), and used as a power source of in-vehicle devices such as a motor.

The fuel cell 10 includes a frame equipped membrane electrode assembly 12 (hereinafter referred to as the frame equipped MEA 12), and a pair of metal separators 14 stacked on both surfaces of the frame equipped MEA 12, respectively. The frame equipped MEA 12 according to the embodiment of the present invention includes a membrane electrode assembly 16 (hereinafter referred to as the MEA 16) and a resin frame member 18 fixed to an entire outer peripheral portion of the MEA 16. It should be noted that, instead of using the frame equipped MEA 12, an MEA 16 which does not have any resin frame member 18 may be applicable to the fuel cell 10.

Figure 2:
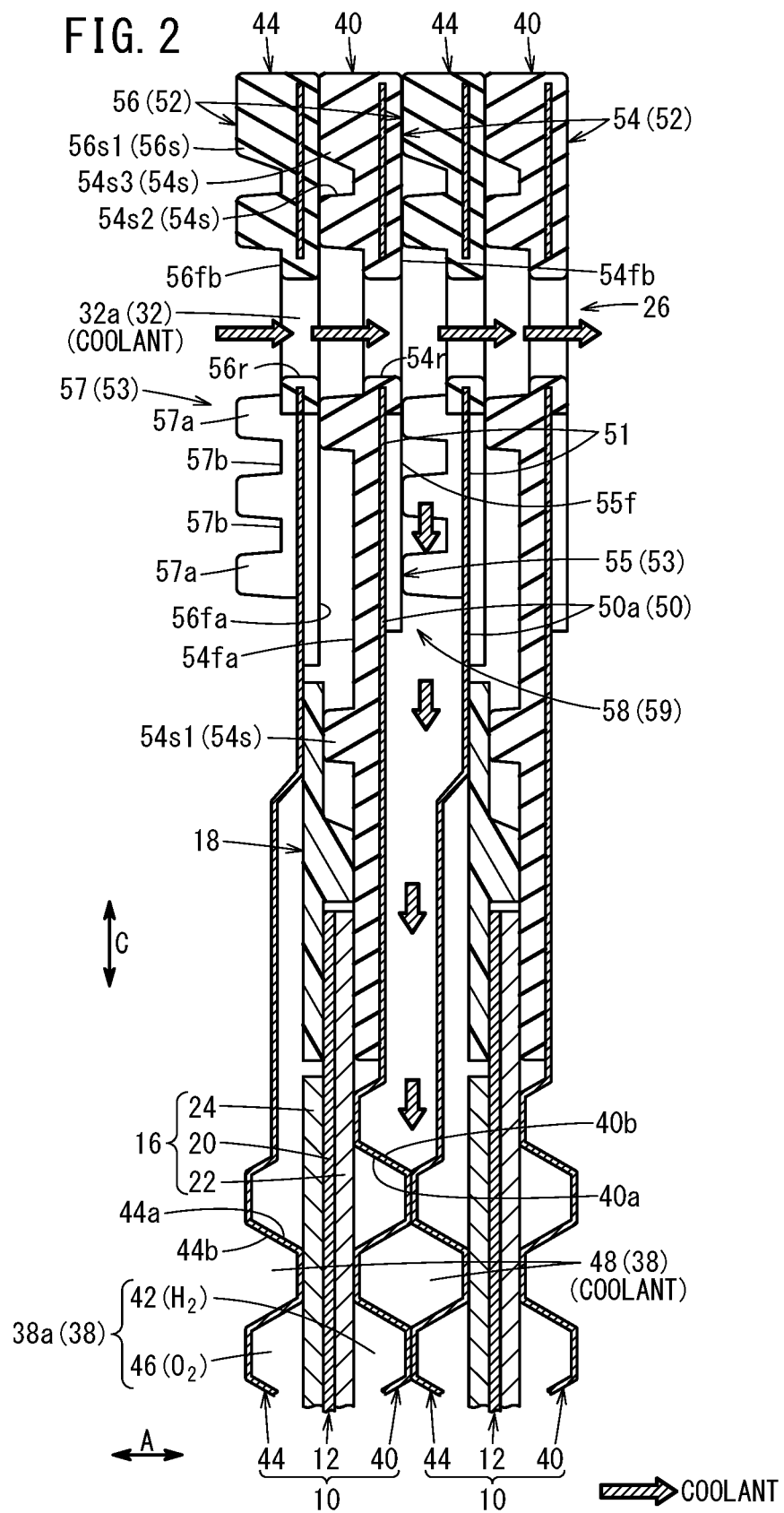
FIG. 2 is a cross sectional view taken along a line II-II in FIG. 1.

As shown in FIGS. 1 and 2, the MEA 16 includes an electrolyte membrane 20 (cation ion exchange membrane), an anode 22 stacked on one surface of the electrolyte membrane 20, and a cathode 24 stacked on the other surface of the electrolyte membrane 20.

For example, the sold polymer electrolyte membrane is a thin membrane of perfluorosulfonic acid containing water. A fluorine based electrolyte may be used as the electrolyte membrane 20. Alternatively, an HC (hydrocarbon) based electrolyte may be used as the electrolyte membrane 20.

Each of the anode 22 and the cathode 24 includes electrolyte catalyst layers (not shown) disposed on both surfaces of the electrolyte membrane 20, and gas diffusion layers (not shown) provided outside the electrode catalyst layers (sides opposite to of the electrolyte membrane 20). For example, the gas diffusion layer is made of carbon paper, etc. The electrode catalyst layer is formed by depositing porous carbon particles uniformly on the surface of the gas diffusion layer, and platinum alloy is supported on surfaces of the carbon particles.

The MEA 16 according to the embodiment of the present invention is an MEA having different sizes of components, where the surface size of the cathode 24 is smaller than the surface sizes of the electrolyte membrane 20 and the anode 22. It should be noted that the MEA 16 may be an MEA having different sizes of components where the surface size of the anode 22 is smaller than the surface sizes of electrolyte membrane 20 and the cathode 24. Alternatively, the MEA 16 may have the same size of components (where the electrolyte membrane 20, the anode 22, and the cathode 24 have the same surface size).

The resin frame member 18 of the frame equipped MEA 12 is joined to an outer peripheral surface of the electrolyte membrane 20 using adhesive, outside the outer peripheral portion of the cathode 24 of the MEA 16. Examples of the material of the resin frame member 18 include general purpose plastics, engineering plastics, super engineering plastics, etc. having electrically insulating properties. The resin frame member 18 may be made of a film, etc.

The resin frame member 18 (frame equipped MEA 12) is disposed inside the plurality of fluid passages 26 provided in the outer peripheral portion of the metal separator 14 having a rectangular shape. It should be noted that the resin frame member 18 and the metal separator 14 may have the same surface size, and the resin frame member 18 may have the same fluid passages 26 as in the case of the metal separator 14.

The plurality of fluid passages 26 of each of the metal separators 14 allow reactant gases and a coolant to flow in the stacking direction of the plurality of fuel cells 10. That is, fuel gas passages 28 (a fuel gas supply passage 28a and a fuel gas discharge passage 28b) form one of reactant gas passages 26a, and allow the fuel gas such as the hydrogen gas to flow in the direction indicated by the arrow A. Oxygen-containing gas passages 30 (an oxygen-containing gas supply passage 30a and an oxygen-containing gas discharge passage 30b) form the other of the reactant gas passages 26a, and allow the oxygen-containing gas such as the air to flow in the direction indicated by the arrow A. Coolant passages 32 (coolant supply passages 32a and coolant discharge passages 32b) form fluid passages 26, and allow the coolant such as water to flow in the direction indicated by the arrow A.

Specifically, in the outer peripheral portion at one end of each of the metal separators 14 in the long side direction (indicated by the arrow B), the fuel gas supply passage 28a and the oxygen-containing gas discharge passage 30b are provided. In the outer peripheral portion at the other end of each of the metal separators 14 in the long side direction (indicated by the arrow B), the oxygen-containing gas supply passage 30*a* and the fuel gas discharge passage 28*b* are provided.

Further, in the outer peripheral portion of the fuel cell 10 in the short side direction (direction indicated by the arrow C), the plurality of coolant supply passages 32*a* and the plurality of coolant discharge passages 32*b* are provided. The plurality of coolant supply passages 32*a* are disposed closer to the side indicated by the arrow B1 than the center of the metal separator 14 in the long side direction is, and a pair of the coolant supply passages 32*a* are disposed at each of both ends in the short side direction. A partition wall 34 for dividing the pair of coolant supply passages 32*a* is provided between the pair of coolant supply passages 32*a*. On the other hand, the plurality of coolant discharge passages 32*b* are disposed closer to the side indicated by the arrow B2 than the center of the metal separator 14 in the long side direction is, and a pair of the coolant discharge passages 32*b* are provided at each of both ends in the short side direction. The partition wall 34 for dividing the pair of coolant discharge passages 32*b* is provided between the pair of coolant discharge passages 32*b*.

It should be noted that the positions and the shapes of the coolant passages 32 (the coolant supply passages 32*a* and the coolant discharge passages 32*b*) are not limited to those described above. For example, the coolant supply passages 32*a* and the coolant discharge passages 32*b* may be provided at both ends of the fuel cell 10 in the longitudinal direction, and the coolant supply passages 32*a* and the coolant discharge passages 32*b* may be arranged together with the fuel gas supply passage 28*a*, the fuel gas discharge passage 28*b*, the oxygen-containing gas supply passage 30*a*, and the oxygen-containing gas discharge passage 30*b* in the direction indicated by the arrow C.

The fuel gas passages 28 are connected to a fuel gas flow field 42 formed between the anode 22 and an anode separator 40 (metal separator 14). The anode separator 40 has a plurality of ridges extending in the direction indicated by the arrow B on its surface 40*a* facing the anode 22, and grooves (wavy flow grooves or straight flow grooves in a plan view) formed between these ridges form the fuel gas flow field 42. The fuel gas flow field 42 is a fluid flow field 38 (one of reactant gas flow fields 38*a*) for allowing a fuel gas which is one of reactant gases to flow along a separator surface.

Further, a rubber member 52 described later is provided on an outer peripheral portion of the fuel gas flow field 42 of the anode separator 40, for preventing leakage of the fuel gas. A bridge section 43 is formed between the fuel gas passages 28 and the fuel gas flow field 42. The bridge section 43 includes flow grooves as a passage of the fuel gas, and the flow grooves are formed by a plurality of ridge shaped rubber extension parts (not shown) of the rubber member 52. Specifically, the bridge section 43 comprises a plurality of flow grooves formed by a metal exposed surface, i.e., a plurality of rubber extension parts of the anode separator 40. In the bridge section 43 in FIG. 1, the plurality of flow grooves are covered by a lid. Alternatively, the plurality of rubber extension parts may be brought into contact with the resin frame member 18 without using any lid.

The oxygen-containing gas passages 30 are connected to an oxygen-containing gas flow field 46 formed between the cathode 24 and a cathode separator 44 (metal separator 14). The cathode separator 44 has a plurality of ridges extending in the direction indicated by the arrow B on its surface 44*a* facing the cathode 24, and grooves (wavy flow grooves or straight flow grooves in a plan view) formed between these ridges form the oxygen-containing gas flow field 46. The oxygen-containing gas flow field 46 is the fluid flow field 38 (the other of reactant gas flow fields 38*a*) for allowing an oxygen-containing gas which is the other of reactant gases to flow along a separator surface.

The rubber member 52 is provided also on an outer peripheral portion of the oxygen-containing gas flow field 46 of the cathode separator 44, for preventing leakage of the oxygen-containing gas. A bridge section 47 is formed between the oxygen-containing gas passages 30 and the oxygen-containing gas flow field 46. The bridge section 47 includes flow grooves as a passage of the oxygen-containing gas, and the flow grooves are formed by a plurality of ridge shaped rubber extension parts (not shown) of the rubber member 52. Specifically, the bridge section 47 comprises a plurality of flow grooves formed by the metal exposed surface, i.e., a plurality of rubber extension parts of the cathode separator 44. Also in the bridge section 47 in FIG. 1, the plurality of flow grooves are covered by a lid. Alternatively, the plurality of rubber extension parts may be brought into contact with the resin frame member 18 without using any lid.

The coolant passages 32 are connected to a coolant flow field 48 formed between the anode separator 40 and the cathode separator 44 that are adjacent to each other. The coolant flow field 48 forms the fluid flow field 38 as a passage of a coolant along separator surfaces. When the back surface of the fuel gas flow field 42 formed on a surface 40*b* of the anode separator 40 and the back surface of the oxygen-containing gas flow field 46 formed on a surface 44*b* of the cathode separator 44 are overlapped with each other, the coolant flow field 48 is formed between the anode separator 40 and the cathode separator 44. The coolant flows from the each of coolant supply passages 32*a* into the coolant flow field 48 in the direction indicated by the arrow B2, and then, the coolant flows from the coolant flow field 48 into each of the coolant discharge passages 32*b*.

Each of the metal separators 14 (the anode separator 40 and the cathode separator 44) includes a thin metal plate 50 (base material) such as a steel plate, a stainless steel plate, an aluminum plate, a plated steel sheet. The metal plate 50 is formed to have a plurality of ridges and grooves by press forming. The metal plate 50 has a corrugated shape in cross section.

Further, each of the metal separators 14 (the anode separator 40 and the cathode separator 44) is provided with the rubber member 52 which covers the metal plate 50, outside of the fluid flow field 38 (the fuel gas flow field 42, the oxygen-containing gas flow field 46, or the coolant flow field 48). The rubber member 52 achieves both of a leakage prevention function of preventing leakage of the reactant gases and the coolant and an insulating function. Hereinafter, the rubber member 52 provided on the anode separator 40 will be referred to as an anode rubber member 54, and the rubber member 52 provided on the cathode separator 44 will be referred to as a cathode rubber member 56.

The material of the rubber member 52 is not limited specially. For example, the rubber member 52 is made of seal material, cushion material, or packing material such as an EPDM, an NBR, a fluoro rubber, a silicone rubber, a fluorosilicone rubber, a butyl rubber, a natural rubber, a styrene rubber, a chloroprene rubber, or an acrylic rubber.

Figure 3:
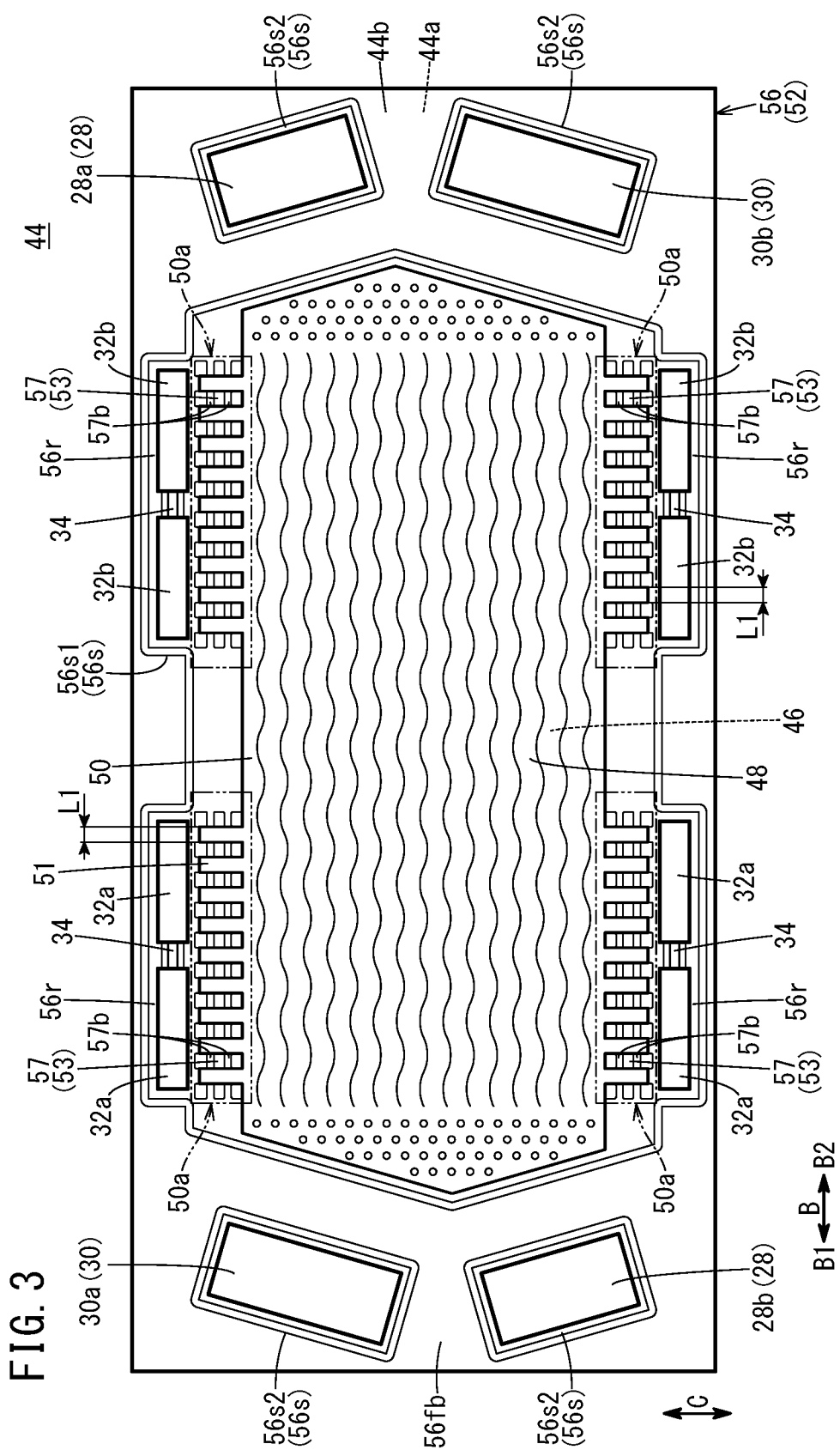
FIG. 3 is a plan view showing a side of a cathode separator where a coolant flow field is formed.

As shown in FIGS. 1 to 3, the cathode rubber member 56 includes a flat seal 56*fa* formed around the oxygen-containing gas flow field 46 on the surface 44*a* of the cathode separator 44, and a flat seal 56*fb* formed around the coolant flow field 48 on the surface 44*b* of the cathode separator 44. Each of the flat seals 56*fa*, 56*fb* includes marginal seals 56*r* formed around the coolant supply passages 32a and the coolant discharge passages 32b. The marginal seals 56r surround the inner marginal portions of the coolant supply passages 32a and the coolant discharge passages 32b continuously.

Further, several protruding seals 56s are formed integrally with the flat seal 56fb of the cathode rubber member 56. The protruding seals 56s protrude from the flat seal 56fb, and prevent leakage of the fuel gas and the coolant in an air-tight and liquid-tight manner. The protruding seals 56s include an outer protrusion 56s1 which is provided on the outer marginal portion of the metal plate 50, and contacts the anode rubber member 54, and fluid passage protrusions 56s2 formed around the reactant gas passages 26a, respectively.

Figure 5:
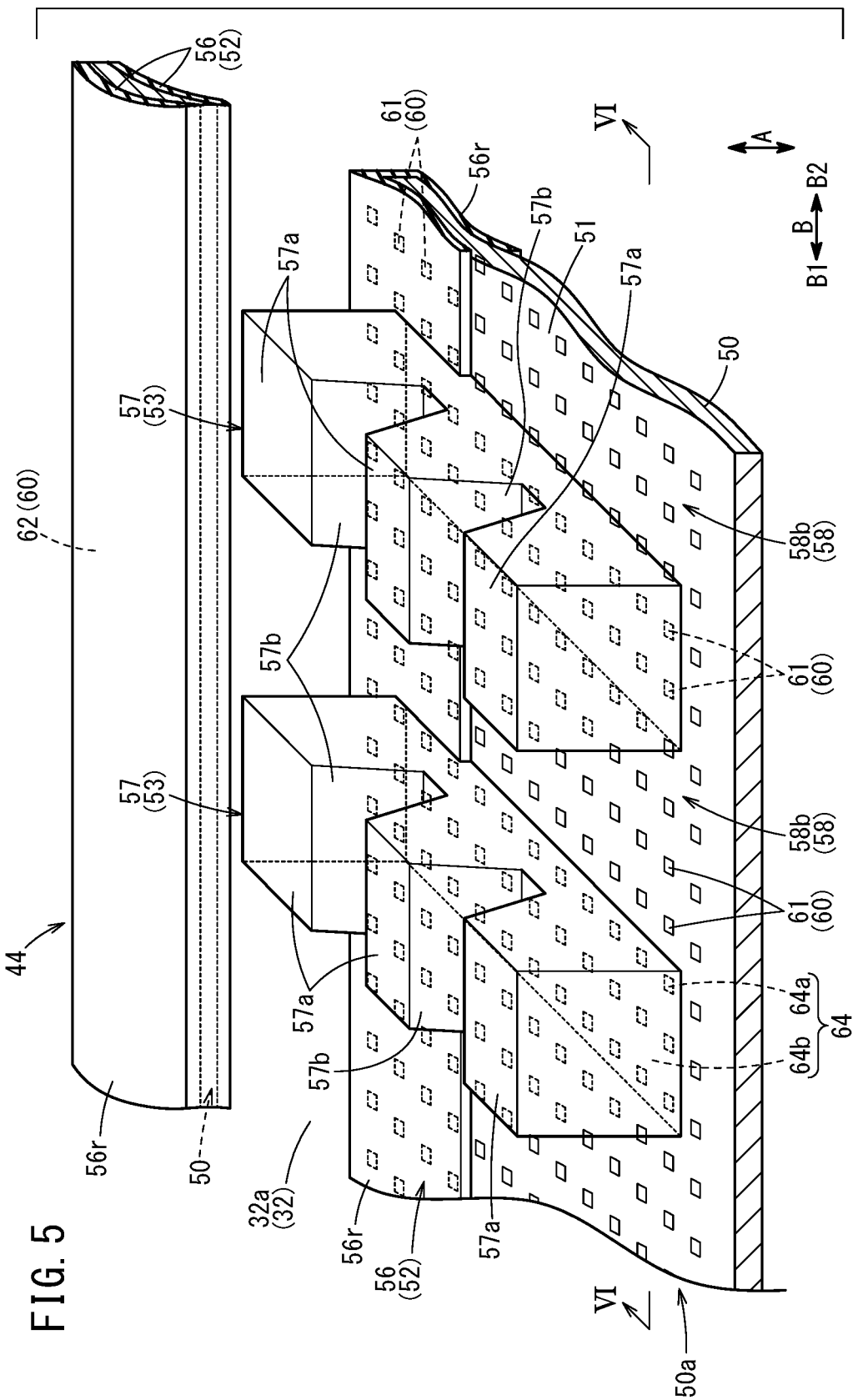
FIG. 5 is a perspective view showing the cathode separator including an enlarged portion where a metal plate of the cathode separator and rubber extension parts are adhered together.

Further, as shown in FIGS. 3 and 5, the cathode rubber member 56 includes a plurality of rubber extension parts 53 (cathode side rubber extension parts 57) arranged on the flat seal 56fb (marginal seal 56r) on the surface 44b of the cathode separator 44. Each of the cathode side rubber extension parts 57 is in the form of a block extending in the direction indicated by an arrow C between the coolant passage 32 (the coolant supply passage 32a, the coolant discharge passage 32b) and the coolant flow field 48.

Specifically, each of the cathode side rubber extension parts 57 protrudes beyond the marginal seal 56r (flat seal 56fb) from the metal plate 50 in the direction indicated by the arrow A (thickness direction). Further, the size of each of the cathode side rubber extension parts 57 in the width direction (direction indicated by the arrow C) is set to be larger than (twice or more, for example) the size of the cathode side rubber extension part 57 in the direction in which the cathode side rubber extension part 57 extends (direction indicated by the arrow B). That is, each of the cathode side rubber extension parts 57 has a narrow shape and is elongated in the direction indicated by the arrow C.

The cathode side rubber extension parts 57 are provided at equal intervals (at intervals of L1) in the direction indicated by the arrow B. No cathode rubber member 56 is provided between the adjacent cathode side rubber extension parts 57, and a metal exposed surface 51 where the metal plate 50 is exposed is formed between the adjacent cathode side rubber extension parts 57. The space formed by the adjacent cathode side rubber extension parts 57 and the metal exposed surface 51 forms a groove 58b as a passage of the coolant (see also FIG. 6).

At least one, e.g., two cutouts 57b are formed in each of the cathode side rubber extension parts 57. The cutouts 57b extend in the direction indicated by the arrow B to connect the adjacent grooves 58b. Each of the cathode side rubber extension parts 57 includes three protruding ends 57a divided by the two cutouts 57b provided in the direction indicate by the arrow C. Each of the cutouts 57b connects the plurality of grooves 58b, for allowing the coolant to flow. It should be noted that the number of the cutouts 57b is not limited to two. One cutout 57b or three or more cutouts 57b may be provided.

Figure 4:
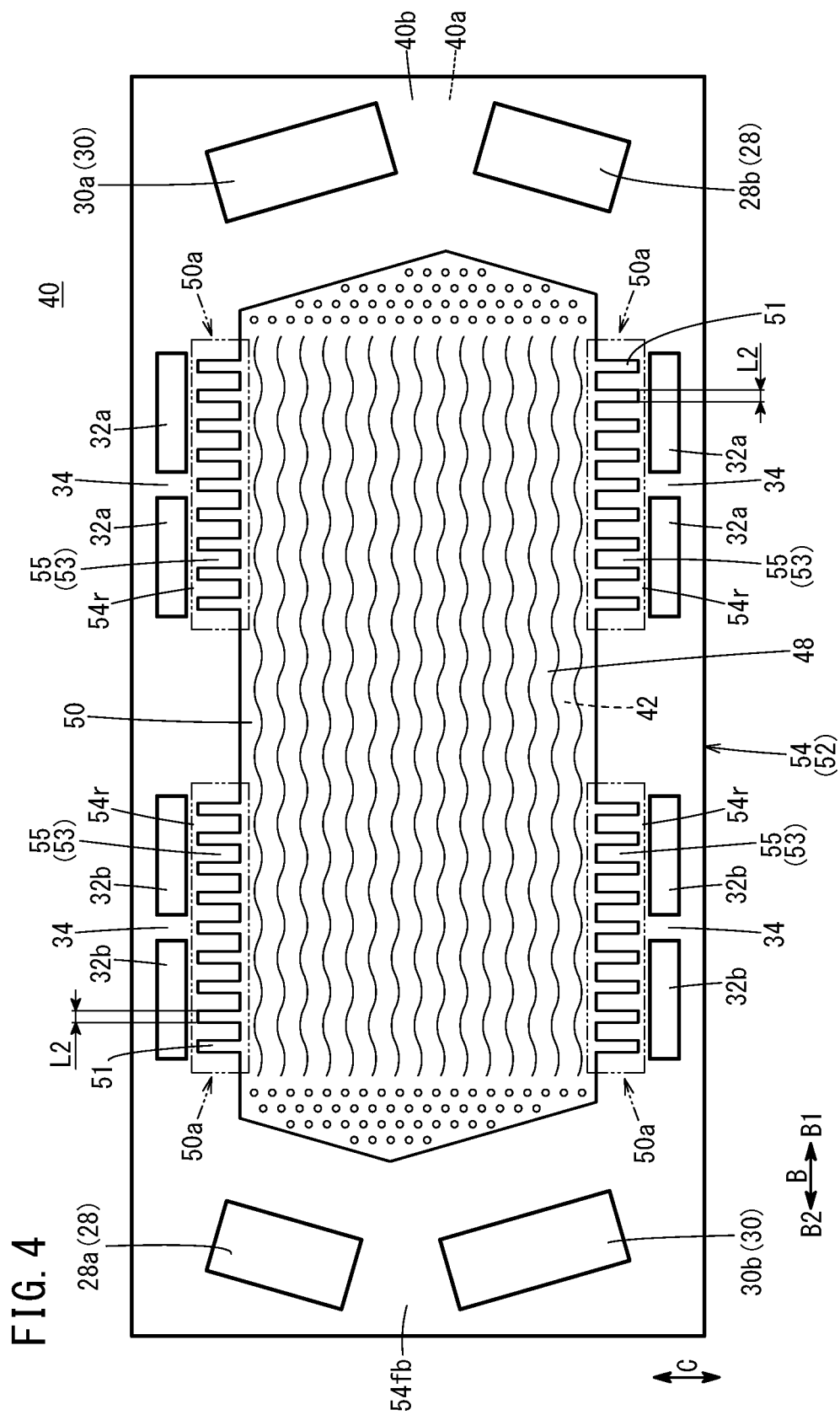
FIG. 4 is a plan view showing a side of an anode separator where the coolant flow field is formed.

As shown in FIGS. 2 and 4, the anode rubber member 54 includes a flat seal 54fa formed around the fuel gas flow field 42 on the surface 40a of the anode separator 40, and a flat seal 54fb formed around the coolant flow field 48 on the surface 40b of the anode separator 40. Each of the flat seals 54fa, 54fb includes marginal seals 54r formed around the coolant supply passages 32a and the coolant discharge passages 32b. The marginal seals 54r surround the inner marginal portions of the coolant supply passages 32a and the coolant discharge passages 32b continuously.

Further, a protruding seal 54s is formed integrally with the flat seal 54fa of the anode rubber member 54. The protruding seal 54s protrudes from the flat seal 54fa to prevent leakage of the oxygen-containing gas, the fuel gas, and the coolant in an air-tight and liquid-tight manner. The protruding seals 54s have an inner protrusion 54s1 which contact the resin frame member 18, a passage protrusion 54s2 which is provided around each of the fluid passages 26 and contacts the cathode rubber member 56, and an outer protrusion 54s3 which is provided on the outer marginal portion of the metal plate 50, and contacts the cathode rubber member 56.

Further, the anode rubber member 54 includes a plurality of rubber extension parts 53 (anode side rubber extension parts 55) arranged in the flat seal 54fb on the surface 40b of the anode separator 40. Each of the anode side rubber extension parts 55 extends in the direction indicated by the arrow C between the coolant supply passages 32a, the coolant discharge passages 32b, and the coolant flow field 48. Each of the anode side rubber extension parts 55 extends from the metal plate 50 in the direction indicated by the arrow A, and has the same thickness as the marginal seal 54r (flat seal 54fb).

Further, each of the anode side rubber extension parts 55 has a narrow shape, and is elongated in the direction indicated by the arrow C. In the state where the anode separator 40 and the cathode separator 44 are stacked together, each of the anode side rubber extension parts 55 is disposed at a position facing each of the cathode side rubber extension parts 57. That is, the protruding end 57a of each of the cathode side rubber extension parts 57 contacts a surface 55f of each of the anode side rubber extension parts 55, in the flat seal 54fb.

The size of each of the anode side rubber extension parts 55 in the width direction (direction indicated by the arrow B) is set to be larger than (twice or more, for example) the size of the anode side rubber extension part 55 in the direction in which the anode side rubber extension part 55 extends (direction indicated by the arrow C). That is, each of the anode side rubber extension parts 55 has a narrow shape, and is elongated in the direction indicated by the arrow C. Further, the size W1 of each of the anode side rubber extension parts 55 in the width direction is larger (wider) than the size W2 of each of the cathode side rubber extension part 57 in the width direction. Therefore, even if the assembling position between the metal separators 14 is shifted in the long side direction, no pressure losses occur in the coolant flow field 48.

The anode side rubber extension parts 55 are provided at intervals (at intervals of L2) in the direction indicated by the arrow B. No anode rubber member 54 is provided between the adjacent anode side rubber extension parts 55, and the metal exposed surface 51 where the metal plate 50 is exposed is formed between the adjacent anode side rubber extension parts 55. In the anode separator 40, the space formed by the adjacent anode side rubber extension parts 55 and the metal exposed surface 51 forms a groove 58a as a passage of the coolant (see also FIG. 6).

Figure 6:
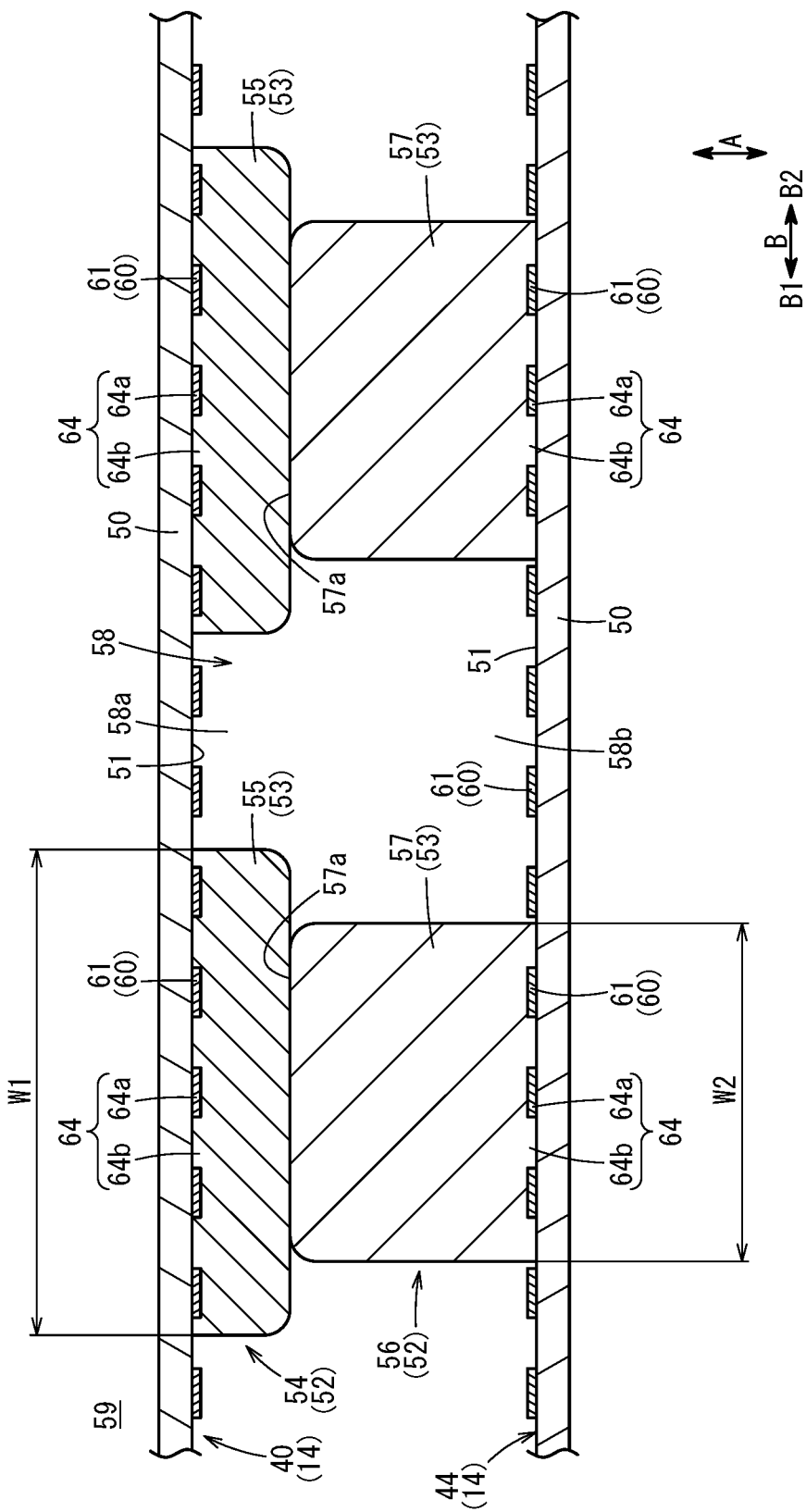
FIG. 6 is a cross sectional view showing bridge structure taken along a line VI-VI in FIG. 5.

As shown in FIGS. 2, 5, and 6, in the state where the fuel cells 10 are stacked together, the above metal separators 14 (the anode separator 40 and the cathode separator 44) form a bridge structure 59 where the coolant can flow between the coolant passages 32 and the coolant flow field 48. The bridge structure 59 is formed by alternately stacking the anode side rubber extension parts 55 and the cathode side rubber extension parts 57 arranged in the direction indicated by the arrow B.

Therefore, the bridge structure 59 includes a fluid channel 58 formed by grooves 58a on the anode separator 40 side and grooves 58b on the cathode separator 44 side, between the rubber extension parts 53 (the anode side rubber extension part 55 and the cathode side rubber extension part 57) that are adjacent to each other in the direction indicated by the arrow B. In each fluid channel 58 in the direction indicated by the arrow A, the marginal seal 54r and the metal exposed surface 51 of the anode separator 40 and the marginal seal 56r and the metal exposed surface 51 of the cathode separator 44 face each other.

Further, in the fuel cell 10 according to the embodiment of the present invention, the metal separator 14 provided with the rubber member 52 adhered to the surface of the metal plate 50 is used. In this case, in the metal separator 14, a primer 60 which enhances adhesiveness is coated on the surface of the metal plate 50 before adhering the rubber member 52 to the metal plate 50, so that adhesion between the metal plate 50 and the rubber member 52 is improved through the primer 60.

Further, the primer 60 according to the embodiment of the present invention is coated on a bridge part 50a of the metal plate 50 (see also the two dot chain line in FIGS. 3 and 4) in a dot pattern (island pattern). Hereinafter, the primer 60 coated on the bridge part 50a will be also referred to as a dot primer 61. The bridge part 50a is a portion between the coolant passages 32 (each of the coolant supply passages 32a and the coolant discharge passages 32b) and the coolant flow field 48. It should be noted that the dot primers 61 are also provided in a portion where the marginal seals 54r, 56r of the fluid channel 58 are formed. On the other hand, the primer 60 is coated on the entire surface (coated on all over the surface) of the metal plate 50 in the portion of the metal separator 14 other than the bridge part 50a. Hereinafter, the primer 60 coated in the portion other than the bridge part 50a will also be referred as a planar primer 62.

For example, a plurality of the dot primers 61 are arranged on the metal plate 50, in the direction indicated by the arrow B and the direction arrow C in a matrix pattern. Stated otherwise, the plurality of dot primers 61 are arranged at equal intervals in the longitudinal direction and the lateral direction. It should be noted that the plurality of dot primers 61 may be arranged not only in the matrix pattern but also in an irregular pattern.

Further, in FIG. 5, the dot primers 61 have a substantially quadrangular shape, and have the same area. It should be noted that the shape of each of the dot primers 61 is not limited specifically, and may have a circular shape or any other polygonal shape. The dot primers 61 may have the same shape and/or area, or may have different shapes and/or areas. Further, the maximum length of each of the dot primers 61 is smaller than the width of the anode side rubber extension part 55 and the cathode side rubber extension part 57.

Preferably, the thickness of each of the dot primers 61 is in the range of 3 μm to 15 μm. If the thickness of the dot primers 61 is larger than 15 μm, there is a possibility that, in the state where the fuel cells 10 are stacked together, variation in the line pressure applied to the rubber extension part 53 becomes large, and the seal compression load characteristics are decreased.

Preferably, the ratio of the total area of the plurality of dot primers 61 (primer area ratio) to the area of the adhesion surface of the rubber extension parts 53 is set within the range of 10% to 30%. If the primer area ratio is less than 10%, there is a possibility that the adhesiveness of adhering the metal plate 50 and the rubber member 52 together through the dot primers 61 is decreased. On the other hand, if the primer area ratio is more than 30%, when the water vapor flows between the metal plate 50 and the rubber extension part 53 as described later and is liquefied, the liquid water does not flow easily from the metal plate 50 and the rubber extension part 53.

The plurality of dot primers 61 are coated on the bridge part 50a of the metal separator 14, whereby the dot primers 61 are formed not only in the adhesion portion of each of the rubber extension parts 53 but also in the metal exposed surface 51 between the rubber extension parts 53. Therefore, it is possible to efficiently perform operation of coating the primer 60 on the metal plate 50.

Although the primer 60 coated on the metal plate 50 is not limited specifically, it is preferable to use a silane coupling agent. In the embodiment of the present invention, the primer 60 prepared by mixing the silane coupling agent as main material, a film forming agent, solvents, catalyst, etc. together is used.

By joining of the rubber member 52, a first adhesion portion 64a and a second adhesion portion 64b are formed in a joint border 64 between the metal plate 50 and the rubber extension part 53 in the bridge part 50a. In the first adhesion portion 64a, the metal plate 50 and the rubber extension parts 53 are joined together through the dot primers 61. In the second adhesion portion 64b, the metal plate 50 and the rubber extension parts 53 are joined together without any dot primers 61. The first adhesion portion 64a adheres the metal plate 50 and the rubber member 52 together by a joining force which is higher than that of the second adhesion portion 64b.

Unlike the plurality of first adhesion portions 64a (dot primers 61) formed in a matrix pattern, the second adhesion portion 64b (without any primers) is formed in a continuous manner seamlessly so as to fill an area between the first adhesion portions 64a. This second adhesion portion 64b contacts the metal exposed surface 51 of the metal plate 50 which is exposed to both sides of each of the rubber extension parts 53 in the width direction or toward the coolant flow field 48.

Figure 7:
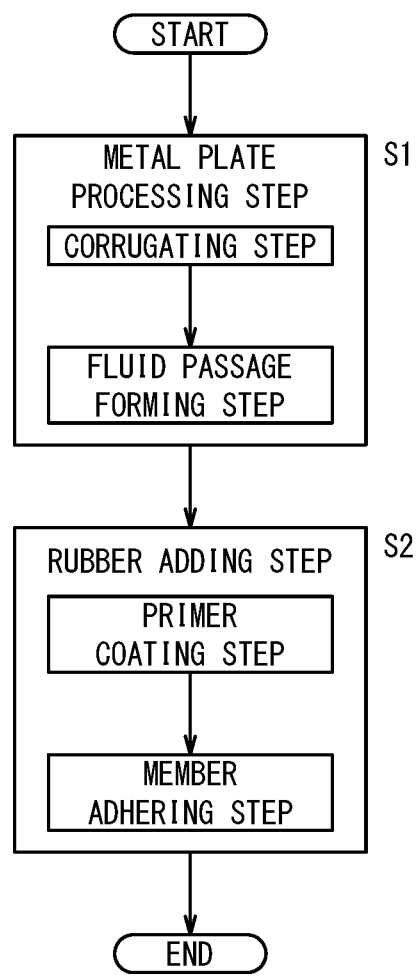
FIG. 7 is a flow chart showing a method of producing a metal separator.

Next, a method of producing the above-described metal separator 14 will be described with reference to FIG. 7. In the method of producing the metal separator 14, a metal plate processing step (step S1) is performed, and thereafter, a rubber adding step (step S2) is performed. Further, in the metal plate processing step, a corrugating step is performed, and thereafter, a fluid passage forming step is performed to form the metal plate 50. Further, in the rubber adding step, a primer coating step is performed, and thereafter, a member adhering step is performed to join the metal plate 50 and the rubber member 52 together.

In the corrugating step, a plate (not shown) forming the metal separator 14 is prepared, and this plate is set in a mold die of a pressing machine (not shown). The pressing machine operates the mold die after the plate is set in the mold die to perform press forming to form corrugations constituting the flow fields (the fuel gas flow field 42, the oxygen-containing gas flow field 46, and the coolant flow field 48) of the metal separator 14.

In the fluid passage forming step, the corrugated plate produced in the corrugating step is set in the pressing machine (not shown). After the plate is set in the pressing machine, fluid passages 26 are formed to penetrate through the corrugated plate by a pierce mold die. It should be noted that, in the production of the metal separator 14, the fluid passage 26 may be formed beforehand, and the fluid fields may be formed subsequently. Alternatively, pressing (formation of corrugation) and formation of the fluid passages 26 may be performed at the same time.

In the primer coating step, using a coating machine (not shown), the primer 60 is coated on the surface of the outer peripheral portion of the metal plate 50 which has been processed beforehand. For example, the coating machine is of an ink jet type which makes it possible to inject liquid droplets of the primer 60 from the front end of a nozzle. Then, the coating machine coats the primer 60 on the bridge part 50a of the metal plate 50 in a discrete manner to form the plurality of dot primers 61. Further, the coating machine forms the planar primer 62 by continuously coating the primer 60 onto the adhesion portion of the rubber member 52 other than the bridge part 50a in the surface direction of the metal plate 50.

In the member adhering step, the metal plate 50 coated with the primer 60 is set in a mold die (not shown), and rubber material is injected between the outer peripheral portion of the metal plate 50 and the mold die recess to form the rubber member 52. At this time, the primer 60 of the metal plate 50 can improve the adhesiveness of the rubber member 52.

Further, since the planar primer 62 is formed in the portion other than the bridge part 50a, the metal plate 50 and the rubber member 52 are adhered together firmly. On the other hand, the dot primers 61 are coated on the joint border 64 between the metal plate 50 and the rubber extension part 53. Therefore, the plurality of first adhesion portions 64a, and the second adhesion portion 64b provided continuously around the first adhesion portions 64a are present.

It should be noted that the structure of adhering the metal plate 50 and the rubber extension parts 53 through the dot primers 61 is not limited to the bridge part 50a of the coolant. For example, in the bridge sections 43, 47 having the fluid channels 58 as the passages of the fuel gas and the oxygen-containing gas as the reactant gases, the metal plate 50 and the rubber extension part 53 may be adhered together through the dot primers 61.

The fuel cell 10 and the metal separator 14 according to the embodiment of the present invention basically have the above structure. Hereinafter, effects and advantages of the fuel cell 10 and the metal separator 14 will be described.

As shown in FIG. 1, a fuel gas, an oxygen-containing gas, and a coolant are supplied from the outside of the fuel cell stack to the plurality of fuel cells 10 forming the fuel cell stack. In each of the fuel cells 10, the fuel gas flows through the fuel gas supply passage 28a in the stacking direction (direction indicated by the arrow A), and then, the fuel gas flows into the fuel gas flow field 42. The fuel gas flows along the fuel gas flow field 42 in the direction indicated by the arrow B, and the fuel gas is supplied to the anode 22 of the MEA 16. Further, in each of the fuel cells 10, the oxygen-containing gas flows through the oxygen-containing gas supply passage 30a in the stacking direction (direction indicated by the arrow A), and the oxygen-containing gas flows into the oxygen-containing gas flow field 46. The oxygen-containing gas flows along the oxygen-containing gas flow field 46 in the direction indicated by the arrow B, and the oxygen-containing gas is supplied to the cathode 24 of the MEA 16.

Then, the MEA 16 performs power generation by electrochemical reactions of the fuel gas supplied to the anode 22 and the oxygen-containing gas supplied to the cathode 24. The fuel gas which flowed through the fuel gas flow field 42 is discharged into the fuel gas discharge passage 28b, and flows through the fuel gas discharge passage 28b in the stacking direction (indicated by the arrow A. Then, the fuel gas is discharged to the outside of the fuel cell stack. In the meanwhile, the oxygen-containing having the low electrical conductivity which flowed through the oxygen-containing gas flow field 46 is discharged into the oxygen-containing gas discharge passage 30b, and flows through the oxygen-containing gas discharge passage 30b in the stacking direction (indicated by the arrow A. Then, the oxygen-containing gas is discharged to the outside of the fuel cell stack.

Further, the coolant comprises liquid having low electrical conductivity such as pure water including ethylene glycol. The coolant flows through the coolant supply passage 32a in the stacking direction (direction indicated by the arrow A), and flows into the coolant flow field 48. The coolant moves along the coolant flow field 48 in the direction indicated by the arrow B, to regulate the temperature of the frame equipped MEA 12. The coolant having flowed through the coolant flow field 48 flows into the coolant discharge passage 32b, flows through the coolant discharge passage 32b in the stacking direction indicated by the arrow A, and is then discharged to the outside of the fuel cell stack.

In the fuel cell 10, the coolant flows through each of the fluid channels 58 of the bridge structure 59 provided between the coolant supply passage 32a and the coolant flow field 48 and between the coolant flow field 48 and the coolant discharge passage 32b. As shown in FIG. 6, each of the fluid channels 58 is surrounded by the metal exposed surface 51 of the metal plate 50 of the metal separator 14 and the rubber extension parts 53 of the rubber members 52.

In this regard, in the state of being stacked together, the anode side rubber extension parts 55 and the cathode side rubber extension parts 57 forming the fluid channel 58 are applied with a compression load, and the shapes thereof are slightly collapsed in the width direction. Therefore, the coolant of the liquid in the fluid channel 58 cannot enter the joint border 64 easily, and flows in the direction in which the fluid channel 58 extends (in the direction indicated by the arrow C).

Figure 8A:
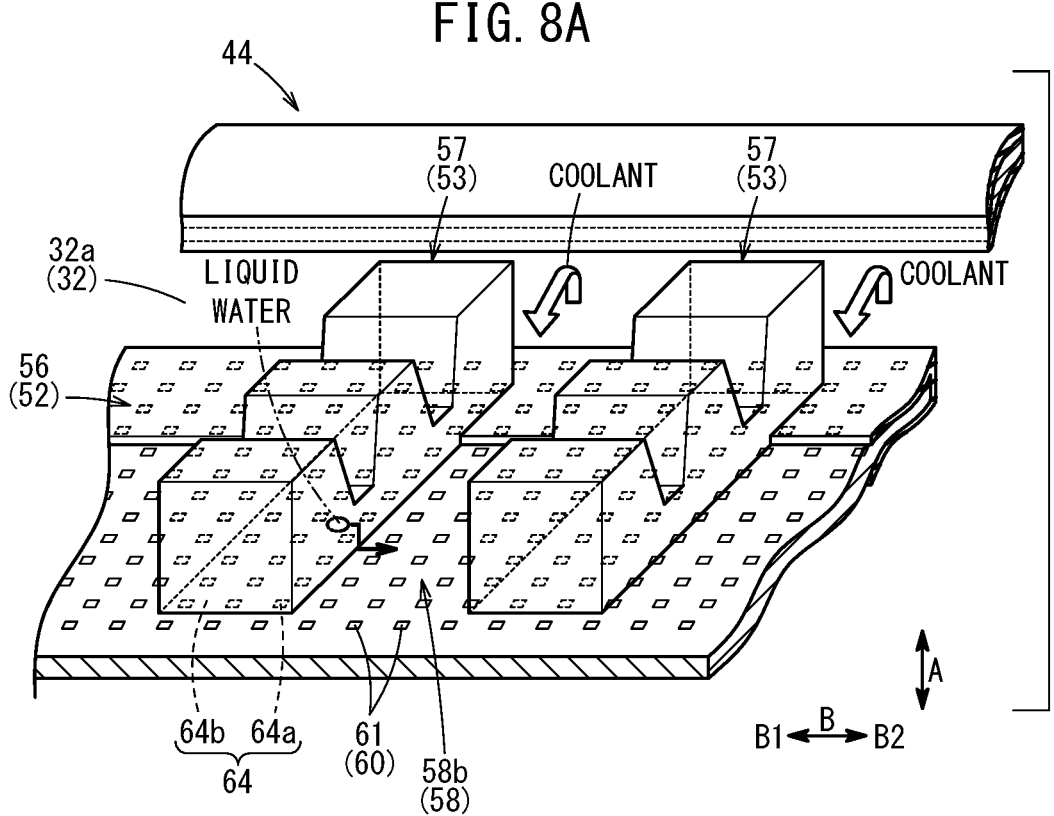
FIGS. 8A and 8B are views showing an example where liquid water discharged at a position where the metal plate and the rubber extension part are adhered together.
Figure 8B:
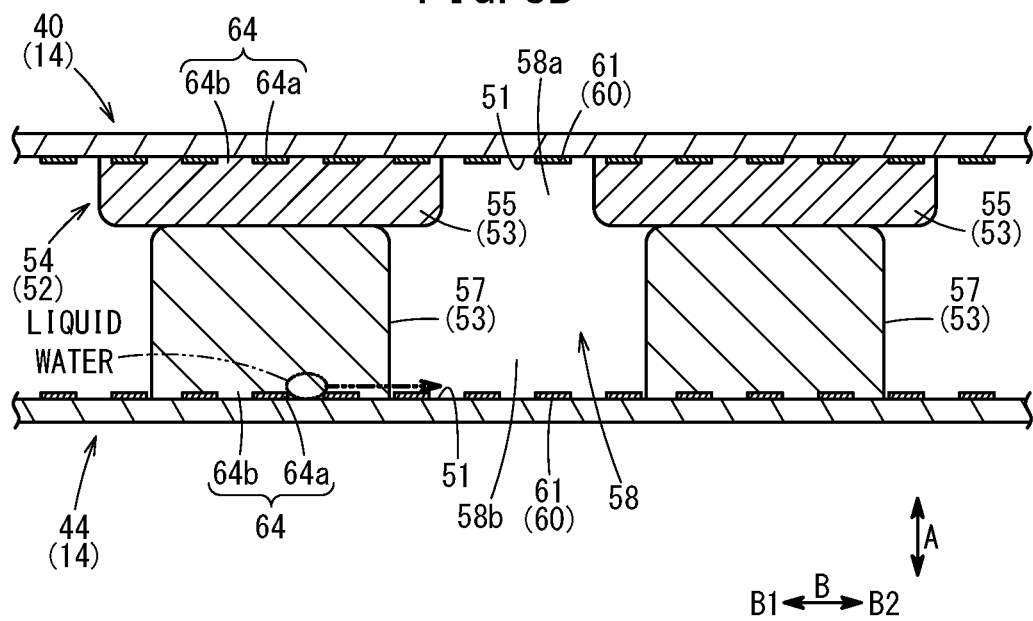

On the other hand, the vaporized coolant may penetrate through the rubber member 52, and enter the joint border 64 between the metal plate 50 and the rubber extension part 53 (the anode side rubber extension part 55 and the cathode side rubber extension part 57). As shown in FIGS. 8A and 8B, the coolant which enters the joint border 64 may be condensed into liquid water, and may form blisters.

In order to suppress formation of the blisters, in the present invention, the primer 60 is coated on the adhesion position of the rubber extension parts 53 in an island pattern. That is, the joint border 64 includes the first adhesion portion 64a where firm joining is attained by the dot primers 61, and the second adhesion portion 64b where the dot primers 61 are not present. In the structure, the liquid water can move through the joint border 64 smoothly by the second adhesion portion 64b. Therefore, the liquid water produced in the joint border 64 is guided through the second adhesion portion 64b. Accordingly, the liquid water is discharged easily from the joint border 64 to the metal exposed surface 51 (or the coolant flow field 48) around the rubber extension parts 53, and it is possible to avoid stagnation of the liquid water in the joint border 64. Therefore, in the fuel cell 10, it is possible to suitably suppress formation of blisters in the joint border 64. Further, in the fuel cell 10, since the liquid water is discharged from the joint border 64, local concentration of the leakage current is prevented. Therefore, it is possible to prevent pitting corrosion due to corrosion resulting from the electric potential difference.

It should be noted that the present invention is not limited to the above embodiment. Various modification can be made in line with the gist of the present invention.

Further, for example, the bridge structure 59 formed by coating the primer 60 in an island pattern is not limited to the bridge part 50a between the coolant passages 32 and the coolant flow field 48. That is, in the metal separator 14, the above bridge structure 59 may be adopted in the bridge section 43 formed by the rubber member 52 between the fuel gas passages 28 and the fuel gas flow field 42. Likewise, in the metal separator 14, the above bridge structure 59 may be adopted in the bridge section 47 formed by the rubber member 52 between the oxygen-containing gas passages 30 and the oxygen-containing gas flow field 46. In this manner, even if the water (liquid) produced in the fluid route for the fuel gas or the oxygen-containing gas is vaporized and the water vapor enters the portion between the rubber member 52 of the bridge sections 43, 47 and the metal plate 50, it is possible to suitably discharge the water vapor from the bridge sections 43, 47.

The above fuel cell 10 has structure where the dot primers 61 are coated also on the metal exposed surface 51 (bridge part 50a). However, the fuel cell 10 (metal separator 14) may have structure where the primer 60 (planar primer 62) is coated at a portion where the rubber covering is required in the metal exposed surface 51. Also in this case, since adhesion is performed by the dot primers 61 between the metal plate 50 and the rubber extension parts 53, it is possible to suitably discharge the liquid water from the joint border 64.

The technical concept and the advantages understood from the above embodiment will be described below.

According to a first aspect of the present invention, the metal separator 14 is provided. The metal separator 14 is stacked on each of both surfaces of the membrane electrode assembly 16 to form the fuel cell 10. The membrane electrode assembly 16 includes the electrolyte membrane 20, and the electrodes (the anode 22, the cathode 24) provided on both surfaces of the electrolyte membrane. The metal separator 14 includes the metal plate 50 and the plurality of rubber extension parts 53. The metal plate 50 has the fluid passage 26 configured to allow fluid to flow in a stacking direction. The metal plate 50 forms the fluid flow field 38 configured to allow the fluid to flow along a separator surface. The plurality of rubber extension parts 53 are adhered to the metal plate 50, and extend from the fluid passage 26 toward the fluid flow field 38. Between the plurality of rubber extension parts 53, the metal surface (metal exposed surface 51) of the metal plate 50 is exposed, and the channel (fluid channel 58) configured to connect the fluid passage 26 and the fluid flow field 38 is formed. The plurality of rubber extension parts 53 are adhered to the metal plate 50 through the plurality of dot primers 61 between the metal plate 50 and the rubber extension parts 53.

In the metal separator 14, with the simple structure where the metal plate 50 and the rubber extension parts 53 are adhered together through the plurality of dot primers 61, it is possible to suitably discharge the liquid from the portion between the metal plate 50 and the rubber extension parts 53. That is, in the metal separator 14, even if the vaporized liquid enters the joint border 64 between the metal plate 50 and the rubber extension part 53 and is liquefied, the liquid can be discharged to the outside of the joint border 64 (e.g., metal exposed surface 51) through the portion where the dot primers 61 are not coated. Therefore, in the metal separator 14, it is possible to suppress formation of the blisters between the metal plate 50 and the rubber extension parts 53. Further, in the metal separator 14, by eliminating local concentration of leakage current, it is possible to prevent pitting corrosion due to corrosion resulting from the electric potential difference.

Further, the joint border 64 between the metal plate 50 and the rubber extension part 53 includes the first adhesive portion 64a where the rubber the metal plate 50 and the rubber extension part 53 are adhered together through each of the plurality of dot primers 61, and the second adhesion portion 64b where the plurality of dot primers 61 are not coated and the metal plate 50 and the rubber extension part 53 are directly adhered together. In the structure, in the metal separator 14, the liquid produced between the metal plate 50 and the rubber extension part 53 can be discharged more easily through the second adhesion portion 64b.

Further, the ratio of the total area of the plurality of dot primers 61 to the area of an adhesion surface of the rubber extension part 53 is within the range of 10% to 30%. In the structure, in the metal separator 14, the rubber extension part 53 can be suitably adhered to the metal plate 50, and the liquid produced between the metal plate 50 and the rubber extension part 53 can be discharged more reliably.

Further, the plurality of dot primers 61 are also coated on the metal surface (metal exposed surface 51). By adopting the structure, in the metal separator 14, it is possible to increase the efficiency of the primer coating step of coating the plurality of dot primers 61.

Further, the rubber extension part 53 is a part of the rubber member 52 provided on the metal plate 50, and the adhesion portion of the rubber member 52 excluding the adhesion portions of the plurality of rubber extension parts 53 is adhered to the metal plate 50 through the planar primer 62 coated in a planar shape. By adopting this structure, in the metal separators 14, it is possible to firmly join the metal plate 50 and the rubber member 52 together.

Further, the plurality of dot primers 61 are arranged in a matrix pattern. In the structure, in the case where liquid is produced between the metal plate 50 and the rubber extension part 53, the liquid can more smoothly move through the portions which are continuous between the dot primers 61 and in which the dot primers 61 are not coated.

Further, the metal separator 14 includes, as the fluid passage 26, the coolant passage 32 for a coolant, and in the state where a plurality of the fuel cells 10 are stacked together, the metal separator 14 includes, as the fluid flow field 38, the coolant flow field 48 for the coolant between the metal separator 14 and another metal separator 14 that is adjacent to the metal separator 14, and the rubber extension part 53 adhered by the plurality of dot primers 61 is provided between the coolant passage 32 and the coolant flow field 48. By adopting the structure, in the metal separator 14, it is possible to suppress formation of the blisters at positions where the coolant flows, and prevent pitting corrosion due to the corrosion resulting from the electric potential difference.

Further, the metal separator 14 includes, as the fluid passage 26, the reactant gas passage 26a for a reactant gas, and includes, as the fluid flow field 38, the reactant gas flow field 38a for the reactant gas between the metal separator 14 and the membrane electrode assembly 16. The rubber extension part 53 adhered by the plurality of dot primers 61 is provided between the reactant gas passage 26a and the reactant gas flow field 38a. By adopting the structure, in the metal separator 14, it is possible to suppress formation of the blisters at positions where the reactant gas flows, and prevent pitting corrosion due to the corrosion resulting from the electric potential difference.

Further, according to a second aspect of the present invention, the fuel cell 10 is provided. The fuel cell 10 is formed by stacking a metal separator 14 on each of both surfaces of the membrane electrode assembly 16. The membrane electrode assembly 16 includes the electrolyte membrane 20, and the electrodes (the anode 22 and the cathode 24) provided on both surfaces of the electrolyte membrane 20. The metal separator 14 includes the metal plate 50 and the plurality of rubber extension parts 53. The metal plate 50 has the fluid passage 26 configured to allow fluid to flow in a stacking direction. The metal plate 50 forms the fluid flow field 38 configured to allow the fluid to flow along a separator surface. The plurality of rubber extension parts 53 are adhered to the metal plate 50, and extend from the fluid passage 26 toward the fluid flow field 38. Between the plurality of rubber extension parts 53, the metal surface (metal exposed surface 51) of the metal plate 50 is exposed, and the channel (fluid channel 58) configured to connect the fluid passage 26 and the fluid flow field 38 is formed. The plurality of rubber extension parts 53 are adhered to the metal plate 50 through the plurality of dot primers 61 between the metal plate 50 and the rubber extension parts 53.

Further, according to a third aspect of the present invention, the method of producing the metal separator 14 is provided. The metal separator 14 is stacked on each of both surfaces of the membrane electrode assembly 16 to form the fuel cell 10. The membrane electrode assembly 16 includes the electrolyte membrane 20, and the electrodes (the anode 22 and the cathode 24) provided on both surfaces of the electrolyte membrane 20. The method includes the metal plate processing step of producing the metal plate 50, and the rubber adding step of providing the plurality of rubber extension parts 53 on the metal plate 50. The metal plate 50 has the fluid passage 26 configured to allow fluid to flow in a stacking direction. The metal plate 50 forms the fluid flow field 38 configured to allow the fluid to flow along a separator surface. The rubber extension parts 53 extends from the fluid passage 26 toward the fluid flow field 38. Between the plurality of rubber extension parts 53, the metal surface (metal exposed surface 51) of the metal plate 50 is exposed, and the channel (fluid channel 58) configured to connect the fluid passage 26 and the fluid flow field 38 is formed. In the rubber adding step, the plurality of rubber extension parts 53 are adhered to the metal plate 50 through the plurality of dot primers 61.

What is claimed is:

1. A metal separator for a fuel cell, the metal separator being configured to be stacked on a membrane electrode assembly, the membrane electrode assembly including an electrolyte membrane and electrodes provided on both surfaces of the electrolyte membrane,
   the metal separator comprising:
   a metal plate including a fluid passage configured to allow fluid to flow in a stacking direction, the metal plate forming a fluid flow field configured to allow the fluid to flow along a separator surface; and
   a plurality of rubber extension parts adhered to the metal plate, and extending from the fluid passage toward the fluid flow field,
   wherein, between the plurality of rubber extension parts, a metal surface of the metal plate is exposed, and a channel configured to connect the fluid passage and the fluid flow field is formed, and
   the plurality of rubber extension parts are adhered to the metal plate through a plurality of dot primers between the metal plate and the rubber extension parts,
   wherein a joint border between the metal plate and the rubber extension part comprises:
   a first adhesive portion where the metal plate and the rubber extension part are adhered together through each of the plurality of dot primers; and
   a second adhesion portion where the plurality of dot primers are not coated and the metal plate and the rubber extension part are directly adhered together without intervening the plurality of dot primers, and
   the first adhesive portion adheres the metal plate and the rubber extension part together by a joining force which is higher than a joining force of the second adhesion portion.

2. The metal separator according to claim 1, wherein a ratio of a total area of the plurality of dot primers to an area of an adhesion surface of the rubber extension part is within a range of 10% to 30%.

3. The metal separator according to claim 1, wherein the plurality of dot primers are also coated on the metal surface.

4. A metal separator for a fuel cell, the metal separator being configured to be stacked on a membrane electrode assembly, the membrane electrode assembly including an electrolyte membrane and electrodes provided on both surfaces of the electrolyte membrane,
   the metal separator comprising:
   a metal plate including a fluid passage configured to allow fluid to flow in a stacking direction, the metal plate forming a fluid flow field configured to allow the fluid to flow along a separator surface; and
   a plurality of rubber extension parts adhered to the metal plate, and extending from the fluid passage toward the fluid flow field,
   wherein, between the plurality of rubber extension parts, a metal surface of the metal plate is exposed, and a channel configured to connect the fluid passage and the fluid flow field is formed, and
   the plurality of rubber extension parts are adhered to the metal plate through a plurality of dot primers between the metal plate and the rubber extension parts, wherein
   the rubber extension part is a part of a rubber member provided on the metal plate, and
   an adhesion portion of the rubber member excluding adhesion portions of the plurality of rubber extension parts is adhered to the metal plate through a planar primer coated in a planar shape.

5. The metal separator according to claim 1, wherein the plurality of dot primers are arranged in a matrix pattern.

6. The metal separator according to claim 1, wherein
   the metal separator includes, as the fluid passage, a coolant passage for a coolant, and
   in a state where a plurality of fuel cells are stacked together, the metal separator includes, as the fluid flow field, a coolant flow field for the coolant between the metal separator and another metal separator that is adjacent to the metal separator, and
   the rubber extension part adhered by the plurality of dot primers is provided between the coolant passage and the coolant flow field.

7. The metal separator according to claim 1, wherein
   the metal separator includes, as the fluid passage, a reactant gas passage for a reactant gas, and includes, as the fluid flow field, a reactant gas flow field for the reactant gas between the metal separator and the membrane electrode assembly, and
   the rubber extension part adhered by the plurality of dot primers is provided between the reactant gas passage and the reactant gas flow field.

8. A fuel cell comprising metal separators stacked on both surfaces of a membrane electrode assembly, the membrane electrode assembly including an electrolyte membrane and electrodes provided on both surfaces of the electrolyte membrane, wherein each of the metal separators comprises:

a metal plate including a fluid passage configured to allow fluid to flow in a stacking direction, the metal plate forming a fluid flow field configured to allow the fluid to flow along a separator surface; and a plurality of rubber extension parts adhered to the metal plate, and extending from the fluid passage toward the fluid flow field, wherein, between the plurality of rubber extension parts, a metal surface of the metal plate is exposed, and a channel configured to connect the fluid passage and the fluid flow field is formed, and the plurality of rubber extension parts are adhered to the metal plate through a plurality of dot primers between the metal plate and the rubber extension parts, wherein a joint border between the metal plate and the rubber extension part comprises:

a first adhesive portion where the metal plate and the rubber extension part are adhered together through each of the plurality of dot primers; and a second adhesion portion where the plurality of dot primers are not coated and the metal plate and the rubber extension part are directly adhered together without intervening the plurality of dot primers, and the first adhesive portion adheres the metal plate and the rubber extension part together by a joining force which is higher than a joining force of the second adhesion portion.

9. A method of producing a metal separator for a fuel cell, the metal separator being configured to be stacked on a membrane electrode assembly, the membrane electrode assembly including an electrolyte membrane and electrodes provided on both surfaces of the electrolyte membrane, the method comprising:

a metal plate processing step of producing a metal plate including a fluid passage configured to allow fluid to flow in a stacking direction, the metal plate forming a fluid flow field configured to allow the fluid to flow along a separator surface; and a rubber adding step of providing, on the metal plate, a plurality of rubber extension parts extending from the fluid passage toward the fluid flow field, wherein, between the plurality of rubber extension parts, a metal surface of the metal plate is exposed, and a channel configured to connect the fluid passage and the fluid flow field is formed, and in the rubber adding step, the plurality of rubber extension parts are adhered to the metal plate through a plurality of dot primers, wherein a joint border between the metal plate and the rubber extension part comprises:

a first adhesive portion where the metal plate and the rubber extension part are adhered together through each of the plurality of dot primers; and a second adhesion portion where the plurality of dot primers are not coated and the metal plate and the rubber extension part are directly adhered together without intervening the plurality of dot primers, and the first adhesive portion adheres the metal plate and the rubber extension part together by a joining force which is higher than a joining force of the second adhesion portion.

* * * * *